United States Patent

[11] 3,572,818

[72] Inventor: Thomas E. Lohr, Warren, Mich.
[21] Appl. No.: 843,670
[22] Filed: July 22, 1969
[45] Patented: Mar. 30, 1971
[73] Assignee: Allied Chemical Corporation, New York, N.Y.

[54] VEHICLE SEAT CONSTRUCTION AND ARRANGEMENT
20 Claims, 3 Drawing Figs.

[52] U.S. Cl. .................................................. 296/65, 248/396, 297/317, 297/379
[51] Int. Cl. .................................................. B60n 1/04
[50] Field of Search .......................................... 246/64, 65; 297/317, 318, 232, 379, 14; 248/345, 396, 420; 224/29(.4); 206/19.5 (A); (D14)/6(6.15)

[56] References Cited
UNITED STATES PATENTS
2,170,923  8/1939  Jacobs ........................... 248/395
3,368,840  2/1968  Dangauthier ................... 296/65

Primary Examiner—Benjamin Hersh
Assistant Examiner—Leslie J. Paperner
Attorneys—Barnard, McGlynn & Reising and Jonathan Plaut ABSTRACT: A vehicle seat construction and arrangement for an automobile having a passenger compartment with a console extending fore-and-aft along the central longitudinal axis of the automobile and including an operator's seat on one side of the console and a passenger seat on the other side of the console. Each of the seats includes a unitary frame having an upwardly extending back frame portion and a bottom frame portion extending forwardly from the back frame portion with support and adjustment mechanism for mounting the seat on the vehicle floor. The support and adjustment mechanism for the seat is mounted asymmetrically on the bottom frame portion to provide clearance between the floor and the bottom surface of the bottom frame portion on the opposite side of the fore-and-aft extending central axis of the bottom portion from the support and adjustment mechanism so that passengers in the rear do not have to straddle the support and adjustment mechanism with their feet. The seat construction further includes means defining an enclosure for the support and adjustment mechanism which includes an outer side panel extending rearwardly from the edge of the frame adjacent the support and adjustment mechanism and an inner side panel extending rearwardly from the back frame portion on the opposite side of the support and adjustment mechanism and near the upright central axis of the back frame portion with a rear panel extending between the rear edges of the side panels. The outer side panel includes an outwardly projecting flange which overlies the upper edge of the console to prevent trash and objects from becoming lodged between the seat and the adjacent side of the console.

PATENTED MAR 30 1971  3,572,818
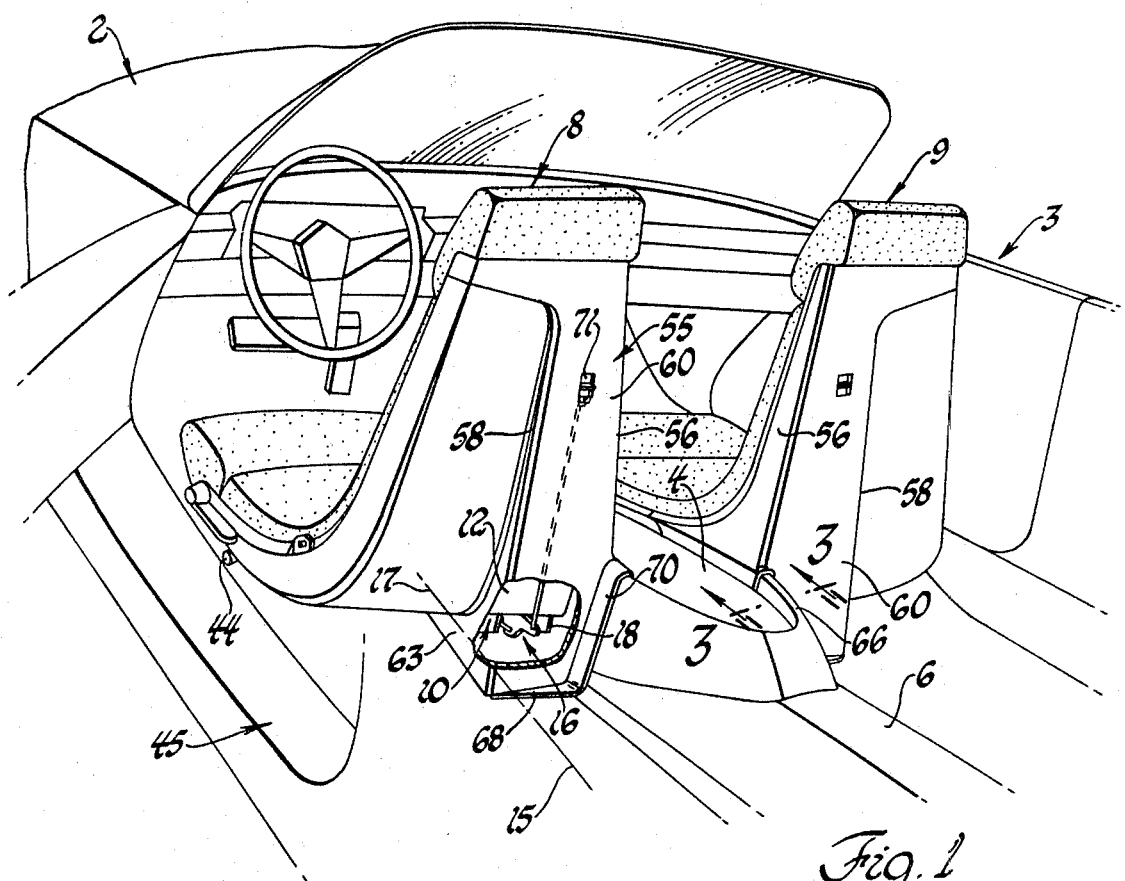
Fig. 1
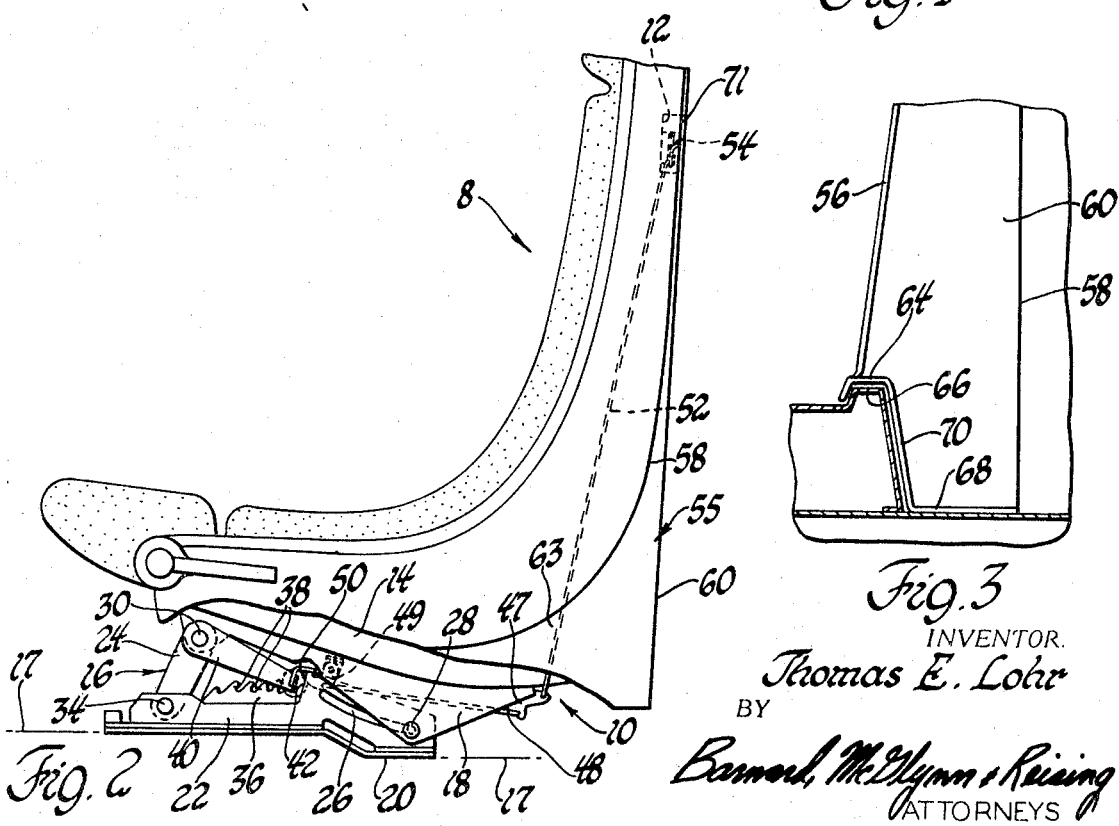
Fig. 2
Fig. 3
INVENTOR.
Thomas E. Lohr
BY
Barnard, McGlynn & Reising
ATTORNEYS

VEHICLE SEAT CONSTRUCTION AND ARRANGEMENT

This invention relates generally to an automobile seat construction and arrangement, and is particularly concerned with an automobile seat construction and arrangement wherein so-called "bucket" seats are mounted adjacent a control console extending fore-and-aft along the central longitudinal axis of the automobile.

In recent years, many automobiles have been provided with so-called "bucket" seats in the front passenger compartment which are mounted on opposite sides of a console extending fore-and-aft along the central longitudinal axis of the automobile. The bucket seats are mounted on support and adjustment mechanisms to permit the seats to be adjusted relative to the vehicle floor to accommodate passengers of different sizes, for example, With such seat arrangements, particularly in compact cars, the passengers in the rear passenger compartment generally have to straddle with their feet the centrally mounted support and adjustment mechanism for the front bucket seats. Since the passengers in the rear seat are usually seated toward the outer edges of the rear seat, it is not always comfortable to place their feet on opposite sides of the centrally mounted support and adjustment mechanism. An additional problem with such arrangements is that articles such as coins and other small objects frequently fall between the bucket seats and the sides of the console.

An object of this invention is to provide a vehicle seat assembly having support and adjustment mechanism for mounting the seat on a vehicle floor wherein the support and adjustment mechanism is asymmetrically mounted on the bottom of the seat so that clearance for receiving the feet of the passengers in the rear seat compartment is provided between the vehicle floor and the bottom surface of the bottom portion of the seat on the opposite side of the central axis of the bottom portion from the support and adjustment mechanism.

Another object is to provide a seat construction for automobiles having a control console located between a pair of bucket seats wherein the bucket seats are provided with flanges overlying the upper edge of the console to prevent articles from falling between the seat and the adjacent sides of the console.

Another object is to provide a vehicle seat assembly including a unitary frame having an upwardly extending back frame portion and a bottom frame portion extending forwardly from the back frame portion with support and adjustment mechanism for mounting the seat on a vehicle floor having a mounting bracket asymmetrically mounted on the lower surface of the bottom frame portion on one side of the fore-and-aft extending central axis of the bottom portion and a base member connected with the bracket and adapted to be secured to the vehicle floor such that the seat frame is mounted for fore-and-aft tilting movement with respect to the base member and clearance is provided between the bottom surface of the bottom frame portion and the automobile floor on the opposite side of the axis from said bracket.

Another object is to provide an automobile seat construction including a frame with an upwardly extending back frame portion and a forwardly extending bottom frame portion with means defining an enclosure for support and adjustment mechanism including an outer side panel extending rearwardly from one edge of the frame and an inner side panel extending rearwardly from the back frame portion near the upright central axis of the back frame position and a rear panel extending between the rear edges of the side panels to form an enclosure for the support and adjustment mechanism.

Other objects, advantages and features of the invention will become apparent from the following description taken in connection with the accompanying drawings in which:

FIG. 1 is a perspective view of a vehicle set seat arrangement according to the present invention;

FIG. 2 is an elevational view of a vehicle seat construction embodying the present invention; and FIG. 3 is a sectional view taken on line 3—3 of FIG. 1.

In the drawings, reference numeral 2 designates an automobile having a passenger compartment designated collectively by reference numeral 3 with a console 4 extending fore-and-aft along the central longitudinal axis of the automobile and overlying an upwardly projecting tunnel 6 for the drive shaft. An operator's seat 8 is mounted on one side of the console and a front passenger seat 9 is mounted on the other side of the console. Seats 8 and 9 are of identical construction with the exception the that the seats are mirror images of each other; that is, seat 8 is constructed to be mounted on the left-hand side of the console 4 and seat 9 is constructed to be mounted on the right-hand side of console 4 as viewed from the rear. Since the seats are of identical construction, only seat 8 will be described in detail, it being understood that seat 9 is of substantially identical construction.

As shown in FIG. 2, seat 8 includes a unitary frame designated collectively by reference numeral 10 which includes an upwardly extending back frame portion 12 and a bottom frame portion 14 extending forwardly from the back frame portion 12. Support and adjustment mechanism indicated collectively by reference numeral 16 for mounting the seat 8 on the vehicle floor 17 includes a mounting bracket 18 asymmetrically mounted on the lower surface of the bottom frame portion 14. Bracket 18 is located at one side of the fore-and-aft extending central axis of the bottom of the seat 8, such axis being indicated by reference numeral 15 in FIG. 1. The support and adjustment mechanism 16 further includes a base member 20 secured to the vehicle floor 17 and connected with the bracket such that the seat 8 is mounted for fore and aft tilting movement with respect to base member 20. The asymmetrical location location of the support and adjustment mechanism 16 provides clearance between the vehicle floor and the bottom surface of the bottom frame portion on the opposite side of the axis 15 from the bracket 18.

Seat 8 is secured by attachment means to the bad base portion 20 for fore-and-aft movement with respect to the base portion in a path such that the seat tilts progressively forwardly as it moves forwardly from the extreme rearward position. The attachment means includes a fore-and-aft extending rail 22 projecting upwardly from the base portion, and a link 24 pivotally connected at its ends between the bracket 18 on the bottom portion 14 of seat 8 and rail 22. The attachment further includes means pivotally and slidably connecting the bottom portion with rail 22 in the form of an upwardly and forwardly curved slot 26 and a pin 28 carried by the bracket 18 and engaged with slot 26. Link 24 has its upper end pivotally connected at 30 with bracket 18 and its lower end pivotally connected at 34 with the rail 22 adjacent the forward portion thereof. As the seat 8 moves forwardly from the position shown in FIG. 2, pin 28 moves upwardly and in slot 26, and the pivot point 30 moves in an arc about pivot point 34 such that the pivot point 30 moves upwardly and forwardly until link 24 reaches a vertical position, and thereafter moves downwardly and forwardly.

Locking means is provided for locking seat 8 relative to base portion 20 and includes a locking plate 36 having a fore-and-aft extending series of slots 38 formed therein. Slots 38 are engageable by a locking lever 40 which is pivotally mounted on bracket 18 by pivot pin 30. The locking lever 40 has a transversely extending bar or strap 42 which is engageable with a selected one of the slots 38 to restrain the seat 8 against movement with respect to the base portion. Strap 42 can be selectively engaged and disengaged with one of the slots 38 by pivoting lever 40 about pivot pin 30. An actuating handle 44 projects from lever 40 in a position to be grasped by the occupant of the seat to selectively engage and disengage strap 42 from one of the slots 38. The person occupying the seat can accordingly move the seat between an extreme rearward position as illustrated in FIG. 2 wherein strap 42 is engaged with the rearmost slot 38 and a forward position in which the strap 42 is engaged with one of the slots 38 located forwardly of the rearmost slot.

Seat 8 can be moved to an extreme forward position with strap 42 disengaged from all of the slots 38 to permit easier access to the rear passenger compartment through the door opening 45 indicated in FIG. 1. For this purpose, an actuating bellcrank lever 47 is mounted on the bottom frame portion 14 between the pair of arms of bracket 18 and is connected through a rod 48 with a bellcrank 49 pivotally connected to the bottom frame portion 14 such that clockwise movement of bellcrank 47 as viewed in FIG. 2 in turn causes clockwise movement of bellcrank lever 49 to act against a flange 50 to disengage strap 42 from the slots 38. Bellcrank 47 can in turn be operated by an actuating rod 52 secured to a latch member 54 on the back frame 12 in the upper portion thereof.

The seat construction further includes means designated generally by reference numeral 55 for defining an enclosure for the support and adjustment mechanism, such means including an outer side panel 56 extending rearwardly from the edge of the frame 10 adjacent the console, an inner side panel 58 extending rearwardly from the back portion of the seat on the opposite side of the support and adjustment mechanism and near the upright central axis of the back frame portion of the seat, and a rear panel 60 extending between the rear edges of the side panels 58 and 56.

The inner side panel 58 extends below the bottom frame portion 14 and has a lower portion 63 extending forwardly beneath the bottom frame portion and depending from the bottom surface of the bottom frame portion. The outer side panel terminates short of the bottom edge of the inner side panel 58 and of the bottom surface of the bottom frame portion and is formed with an outwardly projecting flange 64 which projects over the upstanding ridge 66 formed on the console 4 as shown particularly in FIG. 3. Flange 64 is formed on its outer edge with a downwardly extending lip.

The enclosure means further includes a bottom flange 68 extending rearwardly from the lower end of the rear panel 60 and a side flange 70 which extends rearwardly from the portion of the outer side edge of the rear panel 60 beneath the lower end of the outer side panel 56. The rear panel extends to the lower end of the inner side panel 58 and is inclined forwardly from the rear edge of the inner side panel 58 to the rear edge of the outer side panel 56. An opening 71 is provided in the rear panel for the latch member 54 which is mounted on the back frame portion and is accessible through the opening 71.

The illustrated enclosure means 55 is in the form of a cover or outer shell for the supporting frame 10 and may be formed of molded urethane foam to provide an energy-absorbing cover for protecting the passengers on impact.

While a specific example of the invention has been illustrated and described in the foregoing specification and accompanying drawings, it should be understood that the invention is not limited to the exact construction shown. Alterations and variations in the construction and arrangement of parts, all falling within the scope and spirit of the invention, will be apparent to those skilled in the art.

I claim:

1. A vehicle seat assembly comprising: a unitary frame including an upwardly extending back frame portion and a bottom frame portion extending forwardly from the back frame portion; support and adjustment mechanism for mounting the seat on a vehicle floor including a mounting bracket mounted asymmetrically on the lower surface of the bottom frame portion at one side of the fore-and-aft extending central axis of the bottom portion, and a base member connected with said bracket and adapted to be secured to a vehicle floor such that the seat frame is mounted for fore-and-aft tilting movement with respect to the base member whereby clearance is provided between the bottom surface of the bottom frame portion and the surface on which the seat is adapted to be mounted on the opposite side of said axis from said bracket.

2. A vehicle seat assembly as claimed in claim 1 including means defining an enclosure for said support and adjustment mechanism including an outer side panel extending rearwardly from the edge of said frame adjacent said support and adjustment mechanism, an inner side panel extending rearwardly from the back frame portion on the opposite side of said support and adjustment mechanism and near the upright central axis of said back frame portion, and a rear panel extending between the rear edges of said side panels.

3. A vehicle seat assembly as claimed in claim 2 wherein said inner side panel extends below the bottom frame portion and has a lower portion extending forwardly beneath the bottom frame portion and depending from the bottom surface of said bottom frame portion.

4. A vehicle seat assembly as claimed in claim 3 wherein said outer side panel terminates short of the lower edge of said inner side panel, and the lower end of said outer side panel is formed with an outwardly projecting flange.

5. A vehicle seat assembly as claimed in claim 4 wherein said rear panel extends to the lower end of said inner side panel and is inclined forwardly from the rear edge of said inner side panel to the rear edge of said outer side panel.

6. A vehicle seat assembly as claimed in claim 5 further including a bottom flange extending rearwardly from the lower end of said rear panel and a side flange extending rearwardly from that portion of the outer side edge of said rear panel beneath the lower end of said outer side panel.

7. A vehicle seat assembly as claimed in claim 5 further including an opening in said rear panel, and a latch member mounted on said back frame portion accessible through said opening, said latch member being operatively connected with said support and adjustment mechanism to permit tilting of the seat about said base member.

8. A vehicle seat comprising: a frame having an upwardly extending back frame portion and a forwardly extending bottom frame portion; an outer side panel extending rearwardly from one side edge of said frame; an inner side panel extending rearwardly from the rear surface of said back frame portion near the upright central axis of said back frame portion; and a rear panel extending between the rear edges of said side panels and cooperating with said back frame portion to define an enclosure therewith.

9. A vehicle seat as claimed in claim 8 wherein said inner side panel extends beneath the bottom surface of said bottom frame portion and has a lower portion extending forwardly beneath the bottom frame portion.

10. A vehicle seat as claimed in claim 9 wherein said outer panel terminates short of the lower end of said inner side portion, and the lower end of said outer side portion is formed with an outwardly extending flange.

11. A vehicle seat as claimed in claim 10 wherein said outwardly extending flange is formed on its outer edge with a downwardly extending lip.

12. A vehicle seat as claimed in claim 11 wherein the rear panel extends to the lower end of said inner side panel.

13. A vehicle seat as claimed in claim 12 wherein said rear panel is inclined forwardly from the rear edge of said inner side panel to the rear edge of said outer side panel.

14. A vehicle seat as claimed in claim 12 further including a bottom flange extending rearwardly from the lower end of said rear panel and a side flange extending rearwardly from that portion of the outer side edge of said rear panel beneath the lower end of said outer side panel.

15. In an automobile having a passenger compartment with a console extending fore-and-aft along the central longitudinal axis of the automobile, an operator's seat on one side of the console and a passenger seat on the other side of the console, each of said seats including an upwardly extending back frame portion and a bottom frame portion extending forwardly from the back frame portion; support and adjustment mechanism for mounting the seat on a vehicle floor including a mounting bracket asymmetrically mounted on the lower surface of the bottom frame portion at one side of the fore-and-aft extending central axis of the bottom portion and a base member connected with said bracket and adapted to be secured to a vehicle floor such that the seat frame is mounted for fore-and-aft tilting movement with respect to the base member whereby clearance is provided between the bottom surface of the bottom frame portion on the opposite side of said axis from said bracket and the vehicle floor on which the seat is adapted to be mounted; means defining an enclosure for said support and adjustment mechanism including an outer side panel extending rearwardly from the edge of said frame adjacent said support and adjustment mechanism, an inner side panel extending rearwardly from the back frame portion on the opposite side of said support and adjustment mechanism and near the upright central axis of said back frame portion, and a rear panel extending between the rear edges of said side panels.

16. The construction claimed in claim 15 wherein said inner side panel extends below the bottom frame portion and has a lower portion extending forwardly beneath the bottom frame portion and depending from the bottom surface of said bottom frame portion.

17. The construction claimed in claim 16 wherein said outer side panel terminates short of the lower edge of said inner side panel, and the lower end of said outer side panel is formed with an outwardly projecting flange.

18. The construction claimed in claim 17 wherein said rear panel extends to the lower end of said inner side panel and is inclined forwardly from the rear edge of said inner side panel to the rear edge of said outer side panel.

19. The construction claimed in claim 18 further including a bottom flange extending rearwardly from the lower end of said rear panel and a side flange extending rearwardly from that portion of the outer side edge of said rear panel beneath the lower end of said outer side panel.

20. The construction claimed in claim 19 further including an opening in said rear panel, and a latch member mounted on said back frame portion accessible through said opening, said latch member being operatively connected with said support and adjustment mechanism to permit tilting of the seat about said base member.